(12) United States Patent
Sissoev et al.

(10) Patent No.: US 11,843,181 B2
(45) Date of Patent: Dec. 12, 2023

(54) ACTIVE SOFTWARE DEFINED ELECTRONICALLY STIRRED PHASED ARRAY ANTENNA

(71) Applicant: AEROANTENNA TECHNOLOGY, INC., Chatsworth, CA (US)

(72) Inventors: Alex Sissoev, Chatsworth, CA (US); Joseph Klein, Chatsworth, CA (US)

(73) Assignee: AEROANTENNA TECHNOLOGY, INC., Chatsworth, CA (US)

( * ) Notice: Subject to any disclaimer, the term of this patent is extended or adjusted under 35 U.S.C. 154(b) by 127 days.

(21) Appl. No.: 17/459,254

(22) Filed: Aug. 27, 2021

(65) Prior Publication Data
US 2023/0063390 A1 Mar. 2, 2023

(51) Int. Cl.
*H01Q 3/38* (2006.01)
*H04B 1/44* (2006.01)
*H01Q 1/28* (2006.01)
*H01Q 1/42* (2006.01)

(52) U.S. Cl.
CPC .......... *H01Q 3/38* (2013.01); *H01Q 1/28* (2013.01); *H01Q 1/42* (2013.01); *H04B 1/44* (2013.01)

(58) Field of Classification Search
CPC . H04B 1/44; H01Q 1/28; H01Q 3/385; H01Q 3/38
See application file for complete search history.

(56) References Cited

U.S. PATENT DOCUMENTS

| | | | | |
|---|---|---|---|---|
| 7,439,901 B2* | 10/2008 | Needham | ................. | H01Q 1/28 342/368 |
| 9,444,140 B2* | 9/2016 | Maltsev | ................... | H01Q 3/34 |
| 11,522,279 B1* | 12/2022 | Krüger | ................... | H01Q 1/005 |
| 2016/0233580 A1* | 8/2016 | Aparin | ................. | H03G 3/3052 |
| 2018/0006373 A1* | 1/2018 | Faler | ....................... | H01Q 3/34 |

* cited by examiner

*Primary Examiner* — Patrick C Chen
(74) *Attorney, Agent, or Firm* — Burr & Forman LLP

(57) ABSTRACT

An aviation antenna assembly may include a plurality of antenna elements, a directional control switch associated with each of the antenna elements to enable each of the antenna elements to transition between transmitting via a transmission via a transmit chain or receive via a receive chain, beam forming network elements disposed in the transmit chain and the receive chain, and an electronically controlled phased array stirring assembly operably coupled to the directional control switch of each of the antenna elements and to the beam forming network elements to perform electrical stirring with respect to signals in the transmit chain and the receive chain. The antenna elements, the directional control switch, the beam forming network elements, and the electronically controlled phased array stirring assembly of the antenna assembly are all disposed within a single radome attachable to an aircraft body.

13 Claims, 4 Drawing Sheets

ACTIVE SOFTWARE DEFINED ELECTRONICALLY STIRRED PHASED ARRAY ANTENNA

TECHNICAL FIELD

Example embodiments generally relate to antennas and, in particular, relate to an active software defined electronically stirred phased array antenna for aircraft μ-wave communication systems.

BACKGROUND

Modern aircraft rely on various radio links with end points being air-to-ground, air-to-air, or air-to-satellite. In all cases, at least one of the end points is not stationary. However, if the maximum link quality is required, the end point antenna beam patterns have to be directed toward each other. In the case of non-stationary end points, this will require dynamically adjustable antenna beam patterns. In addition, since signal path losses are quite large, significant signal amplification is needed in both receive and transmit directions. This can be achieved by increasing passive antenna gain (and therefore antenna dimensions). However, there is generally a prevailing need in aircraft applications to reduce the physical antenna dimensions.

BRIEF SUMMARY OF SOME EXAMPLES

In an example embodiment, an aviation antenna assembly may be provided. The antenna assembly may include a plurality of antenna elements, a directional control switch associated with each of the antenna elements to enable each of the antenna elements to transition between transmitting via a transmission via a transmit chain or receive via a receive chain, beam forming network elements disposed in the transmit chain and the receive chain, and an electronically controlled phased array stirring assembly operably coupled to the directional control switch of the each of the antenna elements and to the beam forming network elements to perform electrical stirring with respect to signals in the transmit chain and the receive chain. The antenna elements, the directional control switch, the beam forming network elements, and the electronically controlled phased array stirring assembly of the antenna assembly are all disposed within a single radome attachable to an aircraft body.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
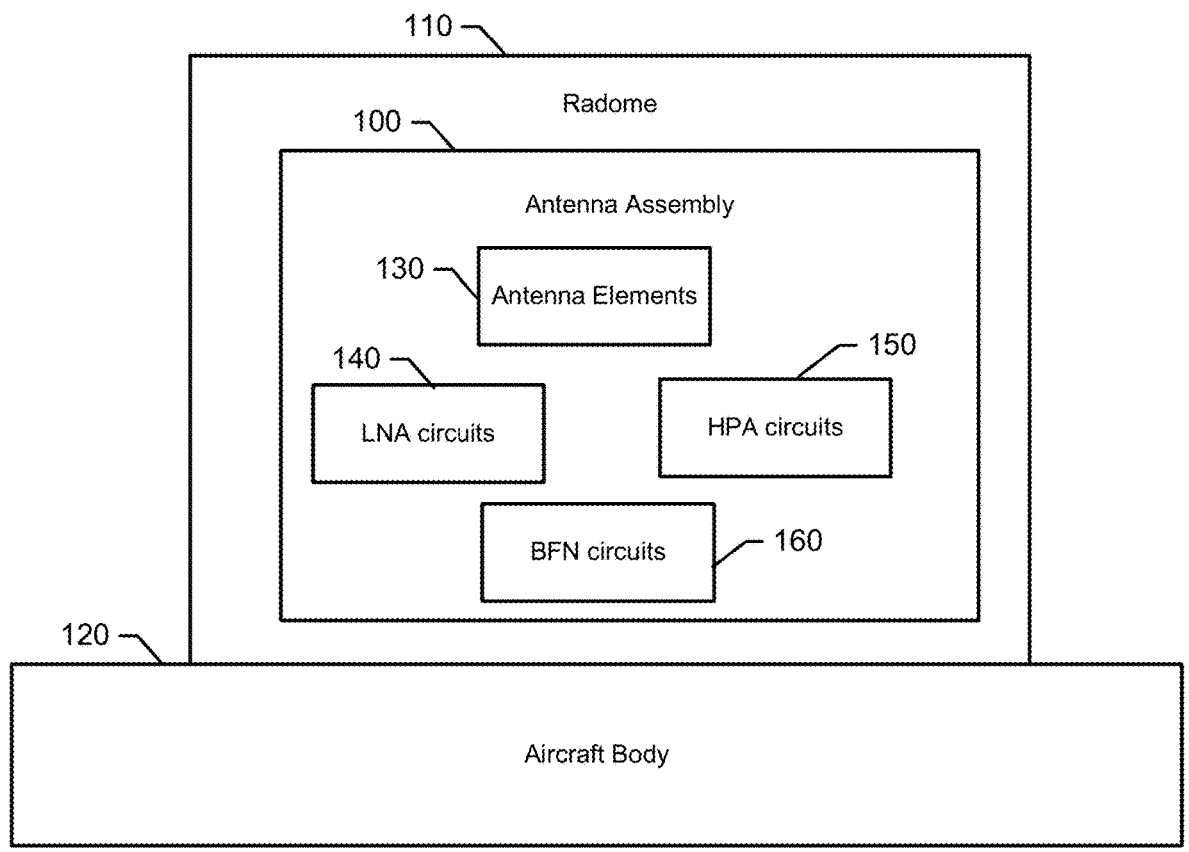
FIG. 1 illustrates a block diagram of an antenna assembly of an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, aircraft applications tend to require reduced physical antenna dimensions to be employed so that merely increasing passive antenna gain is not a viable solution in many cases. Because of this limitation, it is necessary to achieve a balance between passive antenna gain and active signal amplification. Some current systems utilize separate passive antenna elements, a beam forming network (BFN), external low noise amplifiers (LNAs), and external high power amplifiers (HPAs) to attempt to affect this balance. All of these components, are typically placed externally, and therefore will require additional cable interconnections to be made. The additional cable interconnections will consequently typically also increase signal losses. For the receive (RX) direction, additional signal loss introduced before the LNA will result in the elevated noise figure (NF) of the receiver, and therefore, decreased receiver sensitivity. For the transmit (TX) direction, additional signal loss will result in decreased power efficiency, and therefore, increased complexity, power consumption, and ultimately cost for the system. Moreover, since conventionally, a passive BFN is placed next to the passive antenna array elements, additional signal path loss and drawbacks described above may also be introduced.

In an antenna array, the array factor (AF) is a figure that describes the radiation intensity in, or toward, a certain direction (angle), and can be described mathematically, for a 4-element array, as:

$$AF(\theta, \phi) = \sum_{n=1}^{4} a_n e^{j(n-1)(k(\theta,\phi)d\cos\gamma + \beta)},$$

where $\theta=90°$—elevation, and $\phi$=azimuth, and where $a_n$ and $\beta$ are the amplitude and phase excitation coefficients, respectively, $\gamma$ is the array axis angle, d is the distance between the array elements, and k is the wave vector [k=k(azimuth, elevation), for 3-D space], which describes the direction of the signal (wave) propagation. For the described application, it is desirable to maximize the AF in the current, dynamically changing, direction of the other RX/TX end point. To achieve dynamic AF reconfiguration, at least one of the above variables must be manipulated. Array axis angle can be changed mechanically (as in the mechanically stirred antenna systems). Changing the array spacing is impractical, in most applications. And the wave vector depends on the relative geometrical position of the communication end points, and can be considered as a random independent vector variable.

This leaves the amplitude and phase excitation coefficients, $a_n$ and $\beta$, as most practical targets for the electronic beam stirring implementation, and example embodiments are aimed at these targets. In addition, placing the LNA, HPA, and the BFN circuits inside the antenna assembly may help in reducing the interconnect signal path losses described above, and therefore may also be implemented in connection with example embodiments. It is also desirable to have more than one RX direction beams, in order to facilitate optimal beam searching algorithms. In addition, beams must be formed instantaneously, in order to avoid intermediate undefined beams, which can transmit in and receive from undefined and uncontrolled directions. Example embodiments therefore incorporate some or all of these factors as described in greater detail below.

Referring now to FIG. 1, an antenna assembly 100 of an example embodiment is shown. The antenna assembly 100 may include constituent modules or sub-assemblies that are all placed inside a single radome 110 for placement on the external surface of an aircraft body 120. The aircraft body 120 may be a portion of a fuselage of an aircraft, or a wing or other component or surface disposed on the aircraft. In an example embodiment, the constituent modules or sub-assemblies of the antenna assembly 100 may include antenna elements 130, LNA circuits 140, HPA circuits 150 and a BFN circuits 160. Components of the antenna assembly 100 (and of the constituent modules or sub-assemblies thereof) according to an example embodiment are shown in greater detail in FIG. 2.

Figure 2:
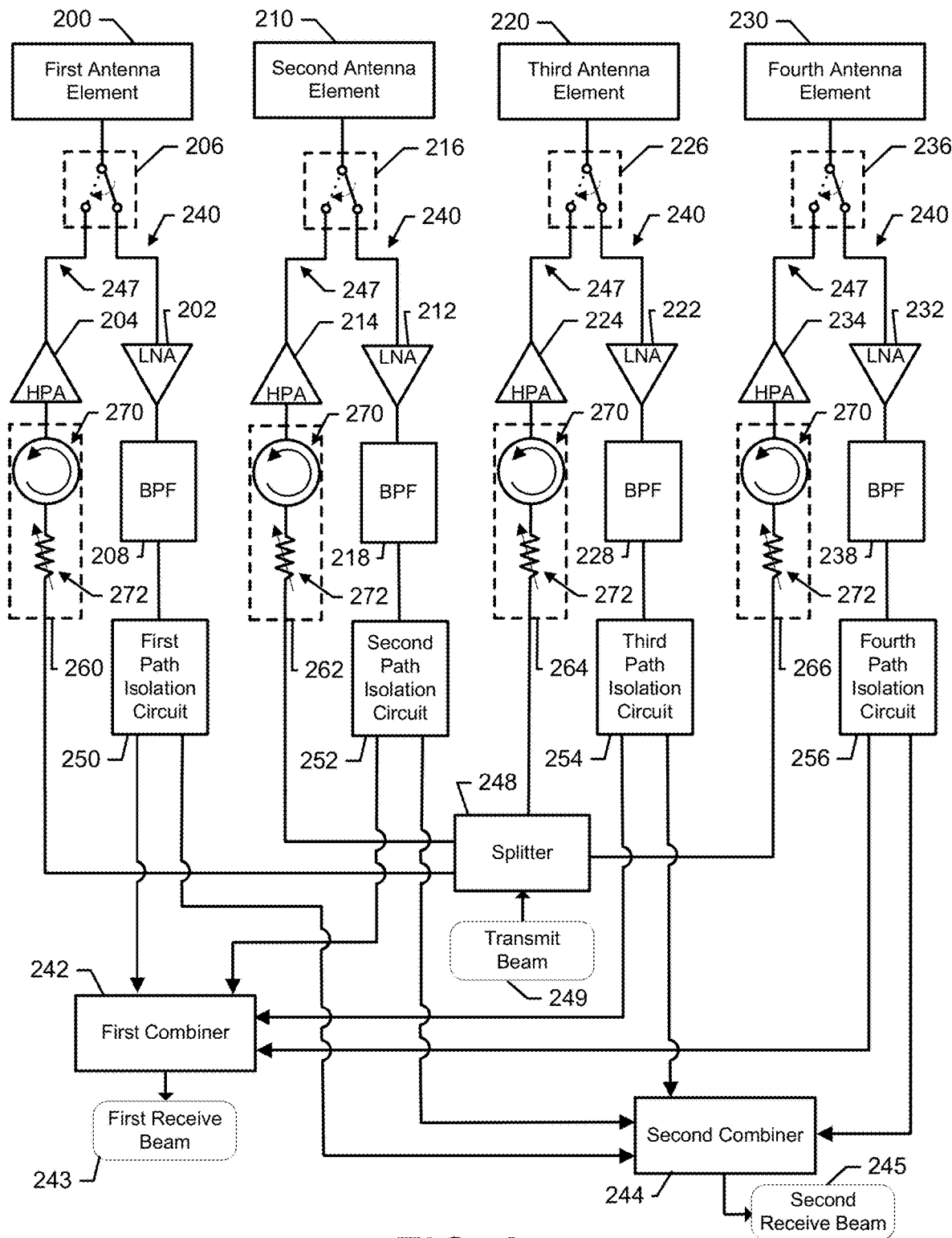
FIG. 2 illustrates a schematic diagram of some components of an antenna assembly of an example embodiment.

Referring now to FIG. 2, the antenna elements 130 of FIG. 1 may include a first antenna element 200, a second antenna element 210, a third antenna element 220 and a fourth antenna element 230. The LNA circuits 140 may include a first LNA 202, a second LNA 212, a third LNA 222 and a fourth LNA 232. The HPA circuits 150 may include a first HPA 204, a second HPA 214, a third HPA 224 and a fourth HPA 234. As shown in FIG. 2, the first LNA 202 and the first HPA 204 are selectively operably coupled to the first antenna element 200 via a first direction control switch 206. Similarly, the second LNA 212 and the second HPA 214 are selectively operably coupled to the second antenna element 210 via a second direction control switch 266, the third LNA 222 and the third HPA 224 are selectively operably coupled to the third antenna element 220 via a third direction control switch 226, and the fourth LNA 232 and the fourth HPA 234 are selectively operably coupled to the fourth antenna element 230 via a fourth direction control switch 236. The first, second, third and fourth direction control switches 206, 216, 226 and 236 therefore determine whether the corresponding antenna elements are receiving or transmitting (e.g., half-duplex operation). Thus, the first, second, third and fourth direction control switches 206, 216, 226 and 236 effectively control whether signals pass via a receive chain 240 to a first combiner 242 that forms a first receive beam 243 and a second combiner 244 that forms a second receive beam 245, or whether signals pass via a transmit chain 247 from a 1:4 splitter 248 that receives a transmit beam 249 and splits the transmit beam 249 for provision to the transmit chain 247 of each respective one of the antenna elements.

Each LNA circuit (e.g., the first, second, third and fourth LNAs 202, 212, 222 and 232) amplifies the signal received at its corresponding antenna element (e.g., the first, second, third and fourth antenna elements 200, 210, 220 and 230, respectively). The signal is then filtered by a corresponding band pass filter (BPF) as shown by a first BPF 208, second BPF 218, third BPF 228 and fourth BPF 238, respectively, in the receive chain 240 of each respective antenna element. The corresponding BPFs reject signals in unwanted frequency bands (i.e., frequencies outside the pass band of the filters). Continuing in each receive chain 240, a respective path isolation circuit is encountered. In this regard, for example, the first antenna element 200 may have a first path isolation circuit 250 associated therewith. Likewise, the second antenna element 210 may have a second path isolation circuit 252 associated therewith, the third antenna element 220 may have a third path isolation circuit 254 associated therewith, and the fourth antenna element 230 may have a fourth path isolation circuit 256 associated therewith.

Each HPA circuit (e.g., the first, second, third and fourth HPAs 204, 214, 224 and 234) amplifies the signal fed to it from a corresponding first, second, third and fourth transmit BFN circuit 260, 262, 264 and 266. The first, second, third and fourth transmit BFN circuits 260, 262, 264 and 266 each include a corresponding instance of a transmit signal amplitude attenuation circuit 270 and a corresponding instance of a transmit signal phase shifter circuit 272. Placing the transmit signal amplitude attenuation circuit 270 before the transmit signal phase shifter circuit 272 reduces the power handling and linearity requirements for the transmit signal phase shifter circuit 272 (which is the more complex of the two circuits). Moreover, placing the BFN circuits prior to the HPAs in each of the transmit chains 247, in the lower power signal path, reduces the power handling and linearity requirements of the BFN circuits to maximize the overall power efficiency of each of the antenna elements because a percentage of a lower transmit power (which is itself a relatively low power) is dissipated rather than a percentage of a higher transmit power (which would cause a high dissipated power) if the BFN circuit was instead located after the HPA (as is conventionally done). As noted above, the 1:4 power splitter 248 splits the transmit beam 249 (or transmit signal) into the four transmit chains 247.

Figure 3:
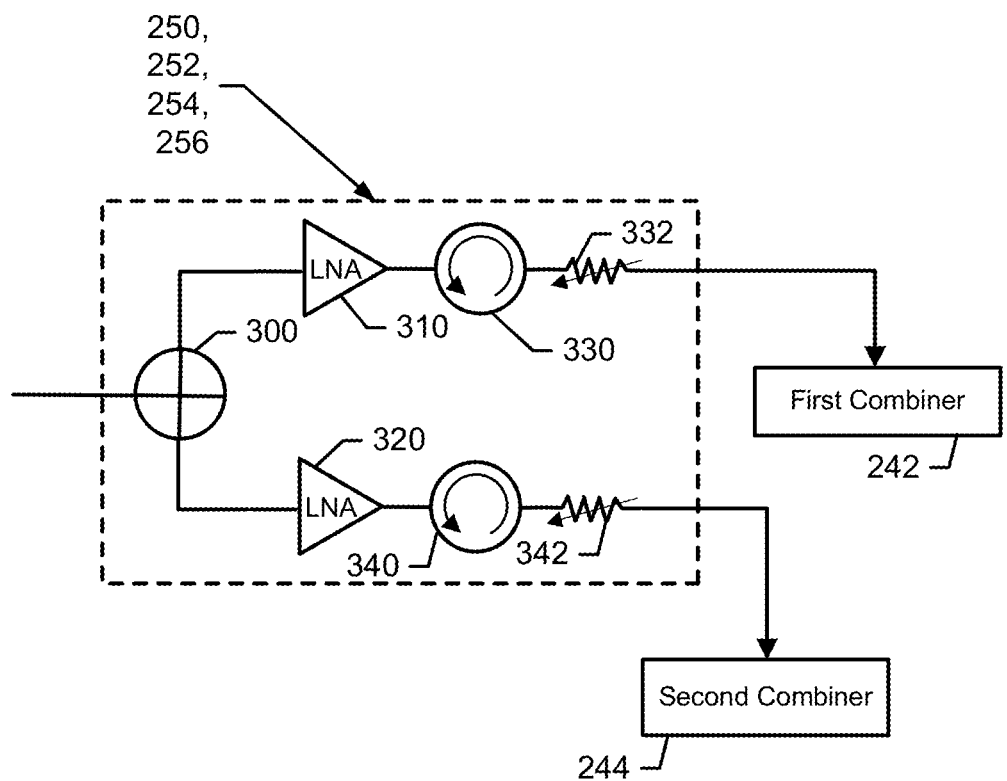
FIG. 3 illustrates a schematic diagram of some components of a path isolation circuit of an example embodiment.

Contents of each of the first, second, third and fourth path isolation circuits 250, 252, 254 and 256 are shown in FIG. 3. In this regard, first, second, third and fourth path isolation circuits 250, 252, 254 and 256 may each include a 1:2 power splitter circuit 300, a first isolated path LNA 310 and a second isolated path LNA 320. As implied by the names, the first and second isolated path LNAs 310 and 320 are in respective different isolated paths created by the power splitter circuit 300, and each isolated path may have a respective instance of a receive BFN circuit therein. For example, a first phase shifter circuit 330 and first amplitude attenuation circuit 332 is operably coupled to the first isolated path LNA 310, and a second phase shifter circuit 340 and second amplitude attenuation circuit 342 is operably coupled to the second isolated path LNA 320. The first phase shifter circuit 330 and the first amplitude attenuation circuit 332 may form a first receive BFN 334. The second phase shifter circuit 340 and the second amplitude attenuation circuit 342 may form a second receive BFN 344. The first and second phase shifter circuits 330 and 340 are configured to set the phase excitation coefficient, $\beta$, for each respective isolated path. The first and second amplitude attenuation circuits 332 and 340 are configured to set the amplitude excitation coefficient, $a_n$, for each respective isolated path. The eight isolated paths that result (i.e., four for each isolated path) are fed into the first and second combiners 242 and 244, as noted above such that all outputs of the first isolated path of each of the first, second, third and fourth path isolation circuits 250, 252, 254 and 256 are combined by the first combiner 242 to form the first receive beam 243, and all outputs of the second isolated path of each of the first, second, third and fourth path isolation circuits 250, 252, 254 and 256 are combined by the second combiner 244 to form the second receive beam 245. The first and second combiners 242 and 244 are each 4:1 power combiners in this example. The first and second receive beams 243 and 245 can each be formed and/or stirred independently and electronically via the control circuits shown in FIG. 4, and described in greater detail below.

Figure 4:
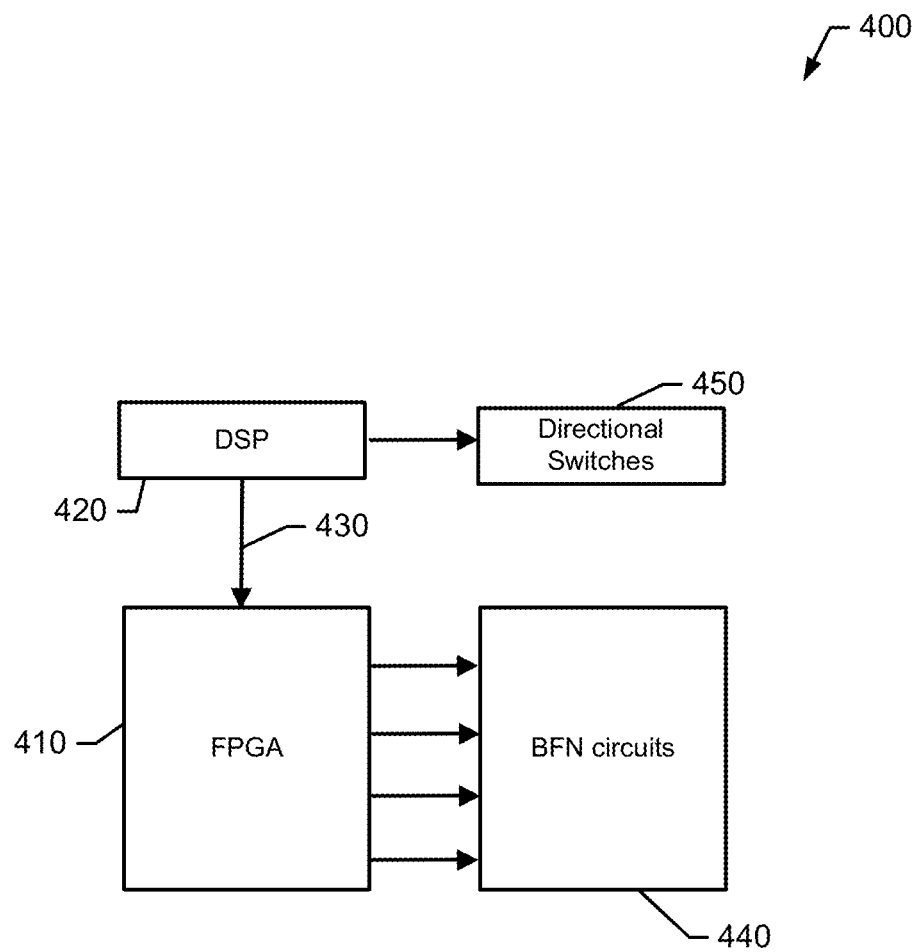
FIG. 4 illustrates a block diagram of an electronically controlled phased array stirring assembly in accordance with an example embodiment.

Referring now to FIG. 4, the components used to provide digital control for independent stirring of the first and second receive beams 243 and 245 are described in greater detail in accordance with an example embodiment. Such components may generally be referred to as an electronically controlled phased array stirring assembly 400. The electronically controlled phased array stirring assembly 400 may include an on-board field programmable gate array (FPGA) 410 and an on-board digital signal processor (DSP) 420 that are operably coupled to each other via a control bus 430. In an example embodiment, in order to achieve a nearly instantaneous beam forming functionality, all of the BFN circuits 440 (e.g., the first, second, third and fourth transmit BFN circuits 260, 262, 264 and 266, and each instance of the first and second receive BFN circuits 334 and 344) may be setup simultaneously using parallel digital control circuits implemented in the FPGA 410. The settings for each of the BFN circuits 440 may further be provided by the DSP 420 via the control bus 430. The DSP 420 may be configured to set the required operational direction (e.g., TX or RX) by controlling directional switches 450 (e.g., the first, second, third and fourth direction control switches 206, 216, 226 and 236). Both the FPGA 410 and the DSP 420 are also physically located in the antenna assembly 100. Moreover, application software is loaded onto the on-board DSP 420 to enable software defined electronically stirred beam forming in the manner described above.

Based on the descriptions above, it can be appreciated that an aviation antenna assembly of an example embodiment may include a plurality of antenna elements, a directional control switch, beam forming network elements, and an electronically controlled phased array stirring assembly. An instance of the directional control switch may be associated with each of the antenna elements to enable each of the antenna elements to transition between transmitting via a transmission via a transmit chain or receive via a receive chain. The beam forming network elements may be disposed in the transmit chain and the receive chain (e.g., in a distributed fashion). The electronically controlled phased array stirring assembly may be operably coupled to the directional control switch of the each of the antenna elements and to the beam forming network elements to perform electrical stirring with respect to signals in the transmit chain and the receive chain. The antenna elements, the directional control switch, the beam forming network elements, and the electronically controlled phased array stirring assembly of the antenna assembly are all disposed within a single radome attachable to an aircraft body.

In some embodiments, the antenna assembly may include additional components/modules, optional features, and/or the components/features described above may be modified or augmented. Some examples of modifications, optional features and augmentations are described below. It should be appreciated that the modifications, optional features and augmentations may each be added alone, or they may be added cumulatively in any desirable combination. For example, the electronically controlled phased array stirring assembly may include a digital signal processor (DSP) that is operably coupled to the directional control switch associated with the each of the antenna elements, and a field programmable gate array (FPGA) operably coupled to the beam forming network elements. In an example embodiment, the DSP and the FPGA may be operably coupled via a control bus. In some cases, the transmit chain may include a high power amplifier and a transmit beam forming network circuit. In an example embodiment, the transmit beam forming network circuit may include a transmit signal amplitude attenuation circuit and a transmit signal phase shifter circuit, and the transmit signal amplitude attenuation circuit may be disposed in the transmit chain before the transmit signal phase shifter circuit. In some cases, the transmit beam forming network circuit may be disposed in the transmit chain before the high power amplifier. In an example embodiment, the FPGA may provide digital control of each of the transmit phase shifter circuit and the transmit signal amplitude attenuation circuit. In some cases, the FPGA may provide digital control of a phase excitation coefficient, fi, for the transmit phase shifter circuit and an amplitude excitation coefficient, $a_n$, for the transmit signal amplitude attenuation circuit. In an example embodiment, the receive chain may include a low noise amplifier disposed closer to a corresponding one of the antenna elements than a band pass filter that is operably coupled to a path isolation circuit. In some cases, the path isolation circuit may include a combiner operably coupling a first isolated path low noise amplifier and first receive beam forming network circuit, and a second isolated path low noise amplifier and second receive beam forming network circuit. In an example embodiment, the first and second receive beam forming network circuits may each include a receive signal amplitude attenuation circuit and a receive signal phase shifter circuit. In some cases, the FPGA may provide digital control of each of the receive phase shifter circuit and the receive signal amplitude attenuation circuit. In an example embodiment, the FPGA may provide digital control of a phase excitation coefficient, fi, for the receive phase shifter circuit and an amplitude excitation coefficient, $a_n$, for the receive signal amplitude attenuation circuit. In some cases, the plurality of antenna elements may include a first antenna element, a second antenna element, a third antenna element, and a fourth antenna element. In an example embodiment, each of the first, second, third, and fourth antenna elements may have a corresponding instance of the transmit chain and the receive chain. A splitter may split a transmit beam to each corresponding instance of the transmit chain, and a first combiner and a second combiner may combine outputs from two isolated paths in each corresponding instance of the receive chain.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An aviation antenna assembly comprising:
a radome attachable to an aircraft body;
a plurality of antenna elements;
a directional control switch associated with each of the antenna elements to enable the each of the antenna elements to transition between transmitting via a transmission via a transmit chain or receive via a receive chain;
beam forming network elements disposed in the transmit chain and the receive chain; and
an electronically controlled phased array stirring assembly operably coupled to the directional control switch of the each of the antenna elements and to the beam forming network elements to perform electrical stirring with respect to signals in the transmit chain and the receive chain,
wherein the antenna elements, the directional control switch, the beam forming network elements, and the electronically controlled phased array stirring assembly of the antenna assembly are all disposed within the radome,
wherein the electronically controlled phased array stirring assembly comprises a digital signal processor (DSP) that is operably coupled to the directional control switch associated with the each of the antenna elements, and a field programmable gate array (FPGA) operably coupled to the beam forming network elements,
wherein the DSP and the FPGA are operably coupled via a control bus,
wherein the receive chain comprises a low noise amplifier disposed closer to a corresponding one of the antenna elements than a band pass filter that is operably coupled to a path isolation circuit, and
wherein the path isolation circuit comprises a combiner operably coupling:
a first isolated path low noise amplifier and first receive beam forming network circuit, and
a second isolated path low noise amplifier and second receive beam forming network circuit.

2. The antenna assembly of claim 1, wherein the transmit chain comprises a high power amplifier and a transmit beam forming network circuit.

3. The antenna assembly of claim 2, wherein the transmit beam forming network circuit comprises a transmit signal amplitude attenuation circuit and a transmit signal phase shifter circuit, and
wherein the transmit signal amplitude attenuation circuit is disposed in the transmit chain before the transmit signal phase shifter circuit.

4. The antenna assembly of claim 3, wherein the transmit beam forming network circuit is disposed in the transmit chain before the high power amplifier.

5. The antenna assembly of claim 1, wherein the first and second receive beam forming network circuits each include a receive signal amplitude attenuation circuit and a receive signal phase shifter circuit.

6. The antenna assembly of claim 5, wherein the FPGA provides digital control of each of the receive phase shifter circuit and the receive signal amplitude attenuation circuit.

7. The antenna assembly of claim 6, wherein the FPGA provides digital control of a phase excitation coefficient, $\beta$, for the receive phase shifter circuit and an amplitude excitation coefficient, $a_n$, for the receive signal amplitude attenuation circuit.

8. The antenna assembly of claim 1, wherein the plurality of antenna elements include a first antenna element, a second antenna element, a third antenna element, and a fourth antenna element.

9. The antenna assembly of claim 8, wherein each of the first, second, third, and fourth antenna elements has a corresponding instance of the transmit chain and the receive chain,
wherein a splitter splits a transmit beam to each corresponding instance of the transmit chain, and
wherein a first combiner and a second combiner combine outputs from two isolated paths in each corresponding instance of the receive chain.

10. An aviation antenna assembly comprising:
a radome attachable to an aircraft body;
a plurality of antenna elements;
a directional control switch associated with each of the antenna elements to enable the each of the antenna elements to transition between transmitting via a transmission via a transmit chain or receive via a receive chain;
beam forming network elements disposed in the transmit chain and the receive chain; and
an electronically controlled phased array stirring assembly operably coupled to the directional control switch of the each of the antenna elements and to the beam forming network elements to perform electrical stirring with respect to signals in the transmit chain and the receive chain,
wherein the antenna elements, the directional control switch, the beam forming network elements, and the electronically controlled phased array stirring assembly of the antenna assembly are all disposed within the radome,
wherein the electronically controlled phased array stirring assembly comprises a digital signal processor (DSP) that is operably coupled to the directional control switch associated with the each of the antenna elements, and a field programmable gate array (FPGA) operably coupled to the beam forming network elements,
wherein the DSP and the FPGA are operably coupled via a control bus,
wherein the transmit chain comprises a high power amplifier and a transmit beam forming network circuit,
wherein the transmit beam forming network circuit comprises a transmit signal amplitude attenuation circuit and a transmit signal phase shifter circuit, and
wherein the transmit signal amplitude attenuation circuit is disposed in the transmit chain before the transmit signal phase shifter circuit, and
wherein the FPGA provides digital control of each of the transmit phase shifter circuit and the transmit signal amplitude attenuation circuit.

11. The antenna assembly of claim 10, wherein the FPGA provides digital control of a phase excitation coefficient, $\beta$, for the transmit phase shifter circuit and an amplitude excitation coefficient, $a_n$, for the transmit signal amplitude attenuation circuit.

12. The antenna assembly of claim 10, wherein the receive chain comprises a low noise amplifier disposed closer to a corresponding one of the antenna elements than a band pass filter that is operably coupled to a path isolation circuit.

13. The antenna assembly of claim 12, wherein the path isolation circuit comprises a combiner operably coupling:
- a first isolated path low noise amplifier and first receive beam forming network circuit, and
- a second isolated path low noise amplifier and second receive beam forming network circuit.

* * * * *